US005639527A

United States Patent [19]

Hurwitz

[11] Patent Number: 5,639,527

[45] Date of Patent: Jun. 17, 1997

[54] BRAIDED WIRE SHEATHING HAVING CHROME APPEARANCE

[76] Inventor: Scott L. Hurwitz, 1370 East Ave., Unit #2, Rochester, N.Y. 14610

[21] Appl. No.: 689,373

[22] Filed: Aug. 8, 1996

Related U.S. Application Data

[63] Continuation-in-part of Ser. No. 602,331, Feb. 16, 1996, abandoned.

[51] Int. Cl.[6] .......... B32B 1/08

[52] U.S. Cl. .......... 428/36.3; 428/36.9; 87/9; 138/123

[58] Field of Search .......... 428/36.3, 36.9, 428/332, 90, 383, 380, 389, 400, 379, 927, 935, 542.4; 174/168, 122 R; 87/8, 9; 138/123

[56] References Cited

U.S. PATENT DOCUMENTS

| | | |
|---|---|---|
| 3,576,388 | 4/1971 | Bruns . |
| 4,273,829 | 6/1981 | Perreault . |
| 4,375,009 | 2/1983 | Fearnside et al. . |
| 4,487,995 | 12/1984 | Hurwitz . |
| 4,494,520 | 1/1985 | Hurwitz . |
| 4,895,740 | 1/1990 | Hiromori et al. . |
| 4,927,683 | 5/1990 | Tsutsui . |
| 5,154,765 | 10/1992 | Armanini . |
| 5,414,211 | 5/1995 | Chan . |
| 5,443,900 | 8/1995 | Nagano et al. . |
| 5,511,391 | 4/1996 | Verstraeten . |

*Primary Examiner*—Kathleen Choi
*Attorney, Agent, or Firm*—Eugene Stephens & Associates

[57] ABSTRACT

A braided wire sheathing is formed with a chrome appearance. This is done by using a silverplated wire coated with a clear enamel tinted with a preferably blue coloring material that is insufficiently present to make the wire look blue, but sufficiently present to give the wire a chrome appearance. When such wire is braided into sheathing, the sheathing also has a chrome appearance.

14 Claims, 1 Drawing Sheet

BRAIDED WIRE SHEATHING HAVING CHROME APPEARANCE

RELATED APPLICATIONS

This application is a Continuation-In-Part of allowed parent application Ser. No. 08/602,331, filed 16 Feb. 1996, entitled BRAIDED WIRE SHEATHING HAVING CHROME APPEARANCE, the parent application being abandoned upon the filing of this Continuation-In-Part application.

TECHNICAL FIELD

Braided wire sheathing.

BACKGROUND

Braided wire sheathing is well known and used for a variety of purposes. For automobiles and motorcycles, for example, braided wire sheathing has been used in larger diameters as cladding for lines for fuel, oil, and water and in smaller diameters as cladding for ignition wires and cables for speedometers, throttles, clutches, and idle controls. Although cladding is used for cables and lines in automobiles and light trucks, it is especially popular in motorcycles and street rods, where cables and lines are more visible. Also, motorcycles use a significant number of chrome-plated visible parts so that braided wire sheathing having a chrome appearance is especially desirable for matching and fitting in with other visible chrome parts. Actual chrome plating of wire sheathing is not practical, though; and there has been no effective way of giving braided wire sheathing a chrome appearance.

SUMMARY OF THE INVENTION

I have discovered that by selecting the right wire and the right enamel coating for the wire, a braided sheathing formed of the wire can have a chrome appearance. The right wire is plated with silver to have a smooth, shiny surface in an appropriate substrate color. The right enamel is a clear enamel, preferably of polyurethane or polyester, that is lightly tinted with a blue coloring material so that when coated on the wire, the enamel does not appear blue, but instead gives the wire a chrome appearance. Braided wire sheathing formed of such a wire also has a chrome appearance, making it highly attractive for automotive uses, and especially for motorcycles where braided wire sheathing is exposed to view and desirably matches the chrome appearance of other exposed parts.

DRAWINGS

DETAILED DESCRIPTION

Figure 1:
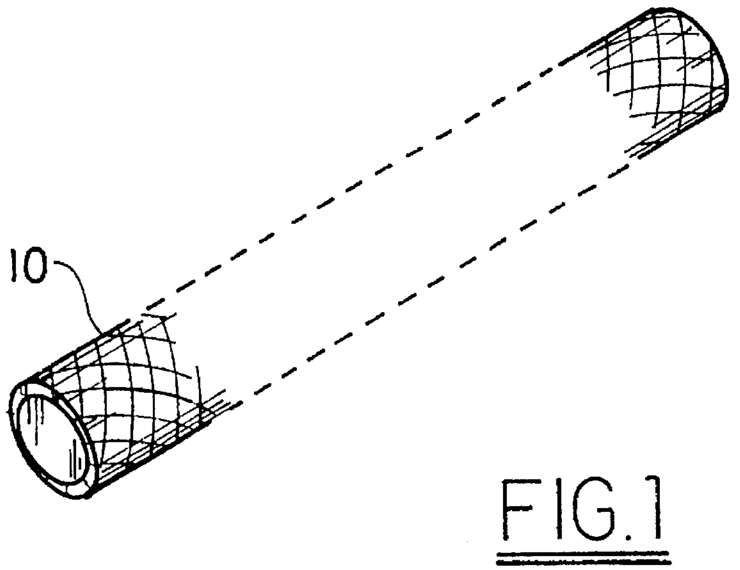
FIG. 1 is a view of a fragment of braided wire sheathing given a chrome appearance according to the invention.

The braiding of wire sheathing is a well-established art. Machines for braiding sheathing are fed with braiding wire from a number of spools, and the wires are interwoven to form the sheathing. Different sizes or diameters of wire can be used, and I prefer wire in the 30 to 36 gauge range. Different metals can also be used for the wire; and my preference is for copper, because of its low cost and desirable qualities.

Whatever metal is selected for the basic wire, the wire surface must be plated with silver so that the wire can then be given a chrome appearance. Silverplated wire is available, including silverplated copper wire, which I prefer. The silverplating makes the wire surface smooth and reflective, which contributes to the eventual chrome appearance. At the uncoated silver stage, though, the wire surface appears merely silvery.

A chrome appearance for the silverplated wire is achieved by coating the wire with a clear enamel that is lightly tinted with a preferably blue coloring material. Coating enamel on wire is commonly done, and machines exist for this purpose. One use for enamel-coated wire is for solenoids, transformers, and the like where the coating provides electrical insulation on a conductive wire. Coatings of "magnet" wire for such purposes have used enamels containing different colors, primarily for color-coding purposes. I prefer to use available wire-enameling machines for coating enamel onto silverplated wire for sheathing purposes.

The enamel itself must have suitable properties for endurance in the environment around automobile and motorcycle engines. These properties include flexibility and resistance to heat, moisture, chemicals, and solvents. The enamel must bond securely to the wire without cracking or peeling as the sheathing moves about during use. Sheathing around automotive and motorcycle engines can encounter gasoline, oils, and other lubricants; water; and temperatures sometimes exceeding 200° F. The enamels I prefer for enduring under such conditions include polyester and polyurethane enamels. Many variations of each are available. Different enamels can be combined in multiple coats on a single wire so that a resistant top coat can cover underlying coats, giving desired characteristics to the total coating.

Another quality of the preferred wire enamel is that it be clear. Perfect clarity is not common, since clear enamels tend to have hues of pale yellow, amber, honey, or milky color. Deviation from clarity should be minimized, though, because this tends to defeat the desired chrome appearance. Clarity of the enamel apparently maximizes the amount of light reflected from the shiny silver surface of the wire.

Besides clarity and endurance in the environment of intended use, the preferred enamel should remain clear in an enameling oven, where temperatures can exceed 600° F. Clarity should also not diminish in sunlight and in the sometimes hot environments around motorcycle engines.

Coating silverplated wire with clear enamel does not produce the desired chrome appearance unless the wire is tinted with a preferably blue dye or pigment. Although blue is a clear preference for color tinting the enamel to the desired chrome appearance, a near approximation can be accomplished with a black coloring material, as explained below. The preferred coloring material should be a true blue color without tending toward aqua, purple, or some other off-blue color. A multitude of pigments and dyes are available in both powder and liquid form, and several of them may be workable.

From among various coloring materials, transparent dyes are preferred for their light transmissive quality. Letting light reflect from the silver surface through the tinted enamel is important for the chrome appearance; and transparent dyes accomplish this somewhat better than pigments, which tend to be opaque. The preferred blue coloring material must be stable and maintain its blue color in the enamel-curing oven, where temperatures can exceed 600° F. The coloring material must also be compatible with and dispersible throughout the enamel, and the coloring material preferably resists deterioration in the engine environment in which the braided sheathing is eventually put to use.

Stability of the enamel and its chrome appearance are preferably enhanced by adding stabilizers to the enamel. A UV stabilizer is desirable to prevent any degradation of the enamel or the resulting chrome color in UV light. Such a stabilizer can be a UV light absorber, such as a hindered amine, operating as a free radical scavenger and preferentially absorbing UV light and dispersing it as harmless energy. A heat stabilizer can be in the form of a hindered phenolic anti-oxidant that stabilizes polymers against thermal oxidative degradation. Such stabilizers are generally known and are preferably used in tiny amounts that do not affect the desired chrome appearance of the enameled wire.

The amount of the coloring material used in the enamel is important to produce a chrome appearance. Too little coloring material leaves the wire appearing beige, mauve, and silverish; and too much blue coloring material makes the wire appear blue. If the right amount of blue coloring material is used, though, the wire will not appear blue, but will have a chrome appearance. This apparently results from the effect of the indiscernible blue coloring material on the light reflected from the enamel and silver surfaces of the wire.

A similar balance is needed if the less preferred black coloring material is substituted for blue coloring material to approximate a chrome appearance. Too little coloring material leaves the wire appearing beige, mauve, and silverish; and too much coloring material darkens and dulls the appearance so that it lacks the luster of chrome.

With one type of blue coloring material that I have used to produce a chrome appearance, the coloring material was mixed with clear enamel in a range of 0.02 to 0.10 percent of coloring material by weight. Slightly more coloring material is necessary for a chrome effect when the enamel is applied to smaller diameter wire, such as 34 or 36 gauge wire; and slightly less coloring material is needed for a chrome appearance when the enamel is applied to larger diameter wire, such as 30 or 32 gauge wire. This results from the different surface areas of the wires and the different amounts of enamel present on the surfaces of wires of different diameters.

Different pigments and dyes may be more or less effective in providing the indiscernible blue tint that produces a chrome appearance so that the percentages of different coloring materials used may well vary. The coloring material may also be affected by coating conditions, and it is likely that no fixed formula will apply to different coloring materials and different coating conditions.

Another factor to be considered in tinting the clear enamel with blue coloring material is that multiple coats of enamel are generally applied to the wire. Wire-coating machines typically run the wire in multiple passes through a curing oven so that a thin coating of enamel is cured on each pass. The number of coats used for a chrome appearance is not critical and depends partly on the thickness of each coating. Each successive coat adds more coloring material, along with more enamel, so that the total number of coats must be considered along with the amount of coloring material in each coat. The total amount of the blue coloring material present must not be sufficient to give the wire a blue appearance and yet must be adequate to give the wire a chrome appearance. Some experimentation is generally required upon selecting enamel and coloring material combinations and numbers of enamel coats to determine the optimum amount of coloring material that should be used. The total thickness of the enamel coatings applied to the wire can vary widely depending on the materials used. I prefer coatings that range from about 0.0005 to 0.001 inches, but coating thicknesses outside this range may also work well, depending on the enamel selected.

The coloring material can be included in the enamel used for any or all of the coatings on the wire. If different enamels are used in multiple coatings on the wire, the coloring material can be added to one of the enamels. Limiting the coloring material to less than all of the enamel coatings is another factor that changes the proportion of coloring material included in the enamel.

The outer surface of the coated enamel is preferably smooth and specularly reflective. Smoothness enhances the chrome appearance. The enamel coating is also preferably concentrically applied to the wire so that the coating is uniformly thick around the entire surface of the wire.

Once the wire is coated with preferably blue-tinted enamel to have a chrome appearance, then spools of the wire are braided into sheathing, which can be made in different diameters. Larger diameters can be used for lines for fuel, oil, and water, for example; and smaller diameters can be used for sheathing ignition wires and cables for devices such as speedometers, throttles, clutches, and idle controls. A schematic example of sheathing 10 for such purposes is shown in FIG. 1.

Figure 2:
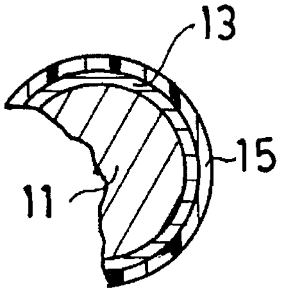
FIGS. 2 and 3 are enlarged fragmentary cross-sectional views of different sizes of sheathing wire given a chrome appearance according to the invention.
Figure 3:
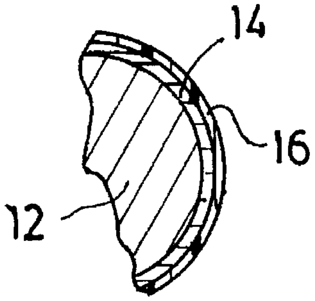

FIGS. 2 and 3 represent respectively smaller and larger diameters of wires 11 and 12 having silverplated surfaces 13 and 14 covered with blue-tinted clear enamel 15 and 16. As light reflects from the silverplate 13 and 14 and from enamel 15 and 16, the smooth, specular surface of the silverplate combines with the indiscernible blue in the enamel to give wires 11 and 12 a chrome appearance.

I claim:

1. Braided wire sheathing formed of silverplated wire coated with a clear enamel tinted with a coloring material in an amount insufficient to give the enamel the color of the coloring material and sufficient to give the wire a chrome appearance so that the braided sheathing has a chrome appearance, the coloring material having a color selected from a group consisting of blue and black.

2. The sheathing of claim 1 wherein more coloring material is added to the enamel when the enamel is applied to smaller diameter wire, and less coloring material is added to the enamel when the enamel is applied to larger diameter wire.

3. The sheathing of claim 1 wherein the enamel on the wire is flexible and durable against heat, moisture, and solvents encountered around motorcycle and automotive engines.

4. The sheathing of claim 1 wherein the enamel is formed in multiple coats on the wire and the coloring material is included in at least one of the enamel coats.

5. The sheathing of claim 1 wherein the total coloring material in the enamel on the wire is divided among multiple coats of the enamel on the wire.

6. The sheathing of claim 1 wherein the enamel is formed of a polyurethane or a polyester.

7. The sheathing of claim 1 wherein the coloring material is about 0.02–0.10% by weight of the enamel.

8. A braided wire sheathing comprising:

a silverplated wire used for forming the sheathing being coated with a clear enamel;

the enamel being tinted with a coloring material in an amount insufficient to give the enamel the color of the coloring material when the enamel is coated on the wire;

the tinted enamel coating on a silver surface of the plated wire giving the sheathing a chrome appearance when the wire is braided to form the sheathing; and the coloring material having a color selected from a group consisting of blue and black.

9. The sheathing of claim 8 wherein more coloring material is added to the enamel when the enamel is applied to smaller diameter wire, and less coloring material is added to the enamel when the enamel is applied to larger diameter wire.

10. The sheathing of claim 8 wherein the enamel on the wire is durable against heat, moisture, and solvents encountered around motorcycle and automotive engines.

11. The sheathing of claim 8 including multiple coatings of the enamel on the wire, and the amount of the coloring material in the enamel is adjusted so that the multiple coatings give the wire a chrome appearance.

12. The sheathing of claim 8 including multiple coatings of the enamel on the wire, at least one of the coatings being tinted with the coloring material.

13. The sheathing of claim 8 wherein the enamel is formed of a polyurethane or a polyester.

14. The sheathing of claim 8 wherein the coloring material is about 0.02–0.10% by weight of the enamel.

* * * * *